United States Patent [19]

Bagnell et al.

[11] Patent Number: 4,514,640
[45] Date of Patent: Apr. 30, 1985

[54] RADIATION SHIELDING STRUCTURES

[76] Inventors: Michael J. Bagnell, 688 Flaming Star Ave., Thousand Oaks, Calif. 91360; William R. Ivy, 1908 Singingwood Ave., Pomona, Calif. 91767

[21] Appl. No.: 425,724

[22] Filed: Sep. 28, 1982

[51] Int. Cl.³ .............................................. G21F 3/04
[52] U.S. Cl. ................................ 250/517.1; 250/515.1
[58] Field of Search .............. 250/515.1, 516.1, 517.1, 250/518.1, 519.1

[56] References Cited

U.S. PATENT DOCUMENTS

| | | | |
|---|---|---|---|
| 2,858,451 | 10/1958 | Silversher | 250/515.1 |
| 3,134,020 | 5/1964 | Shoenfeld | 250/517.1 |
| 3,299,270 | 1/1967 | D'Avella | 250/517.1 |
| 4,400,623 | 8/1983 | Jacobson | 250/517.1 |

Primary Examiner—Bruce C. Anderson
Attorney, Agent, or Firm—William W. Haefliger

[57] ABSTRACT

Radiation shielding components, easily interconnectible to form fully shielding side walls and corners of an enclosure, are provided.

9 Claims, 7 Drawing Figures

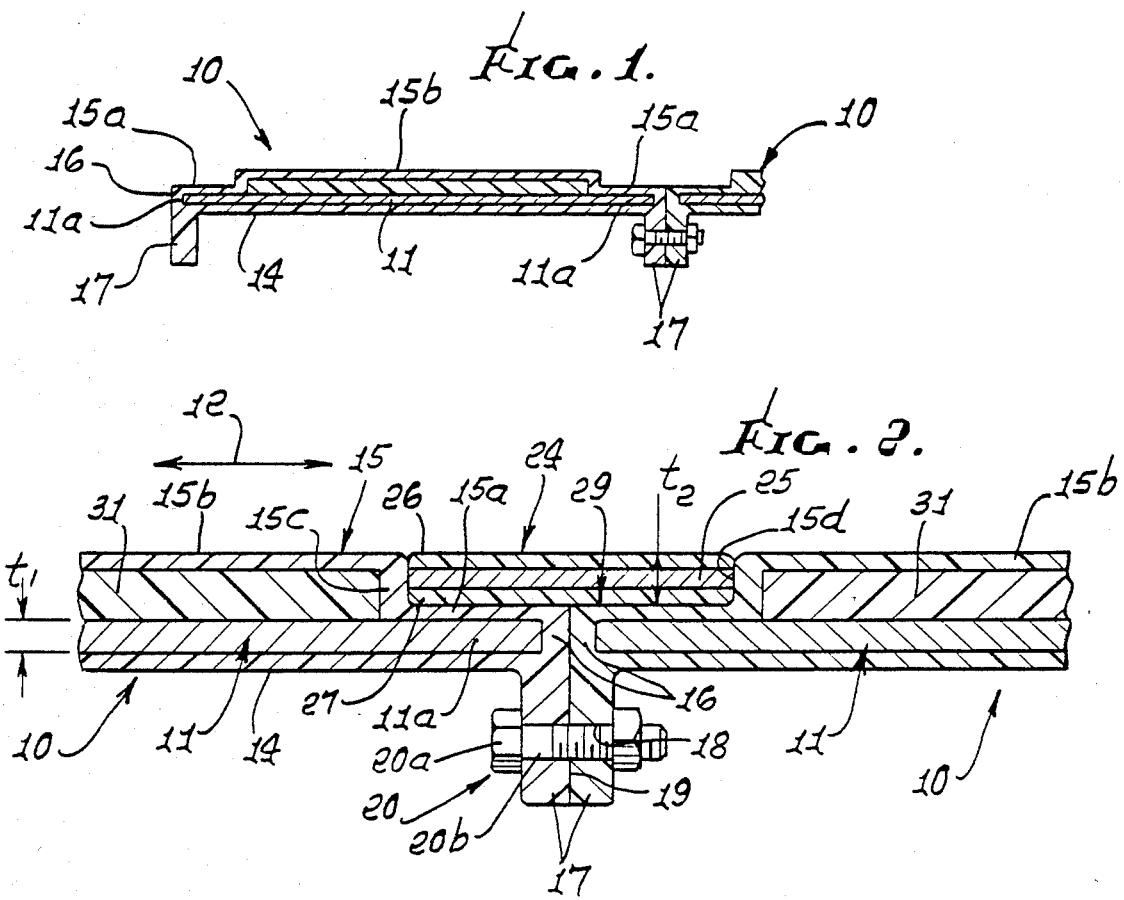
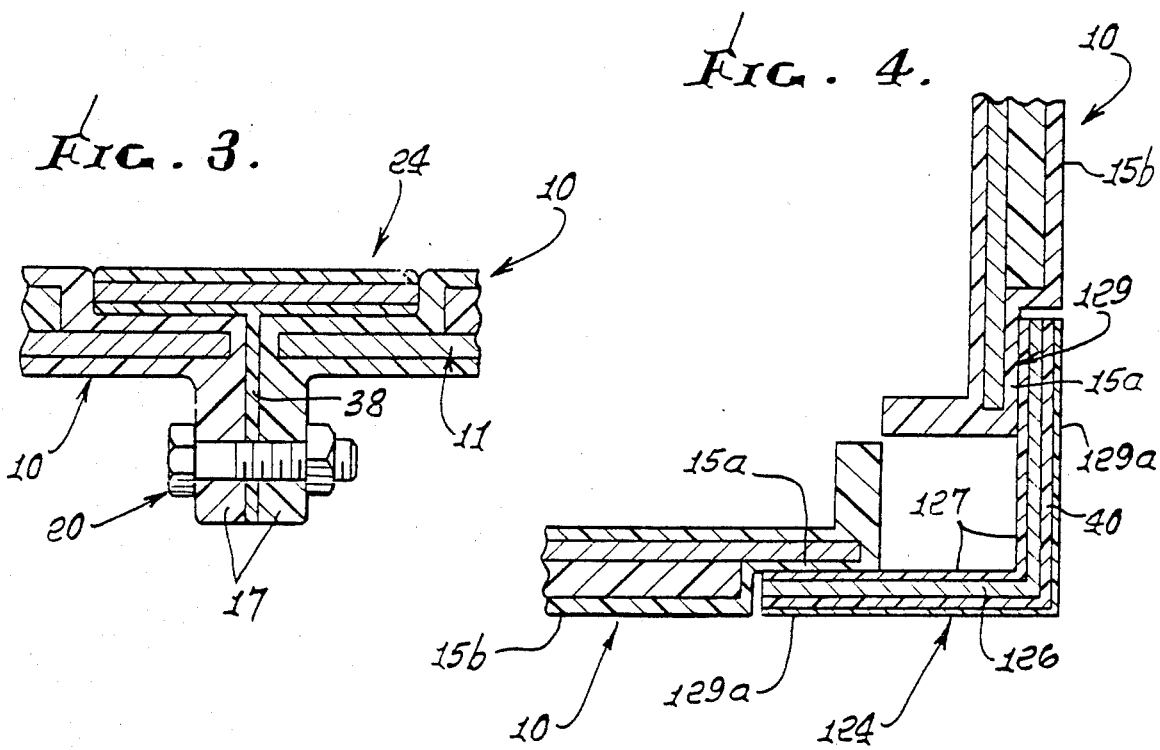

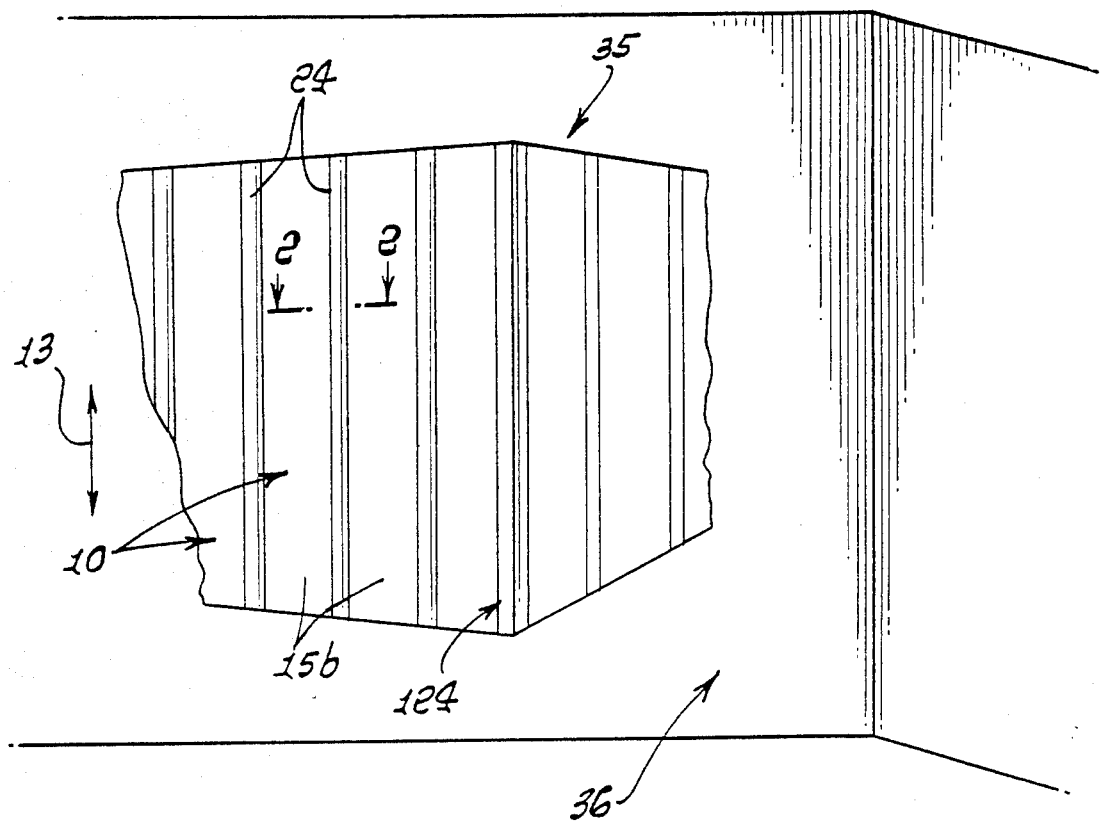
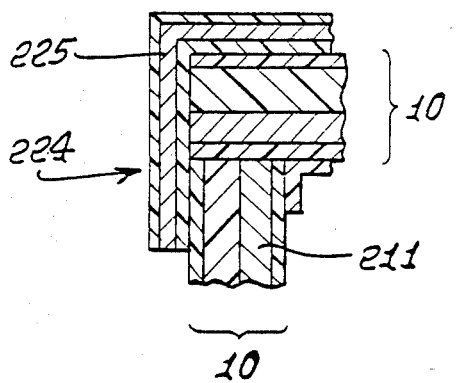
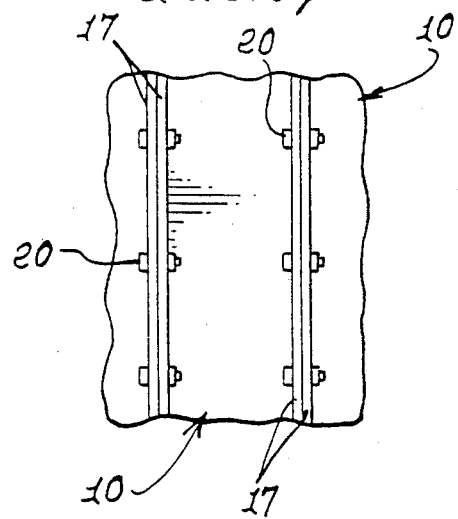

RADIATION SHIELDING STRUCTURES

BACKGROUND OF THE INVENTION

This invention relates generally to radiation shielding, and more particularly to an enclosure made up of easily assembled shielding components.

There is need for radiation shielding enclosures or walls which are easily assembled in offices or rooms, as for example when patients are subjected to X-ray. Unless technicians are suitably protected in such environments, serious harm or injury can result.

SUMMARY OF THE INVENTION

It is a major object of the invention to provide easily assembled components of a wall or enclosure protecting against radiation, and meeting the above need. Basically, the like, interconnectible structural components of the invention comprise (a) a longitudinally elongated body having L-shaped cross-section in lateral planes normal to the longitudinal direction, (b) the body including a panel shaped core consisting of radiation shielding material, and glass fiber layers surrounding said core and attached thereto in covering relation therewith.

As will appear, such components typically may have flanges formed of the same glass fiber material as is used adjacent the cores, and such flanges are interconnectible as by removable fasteners, to bring the shielding cores of adjacent units into proximity to one another. Further, an auxiliary panel or panels, including radiation shielding material, may then be attached in bridging relation with the flange connected units, and the assembly may be carried out to provide a flush surface wall or enclosure. To this end, filler material such as plastic may be sandwiched in each unit, to provide a recess or recesses to receive the auxiliary panel; and the auxiliary panel may have L-shaped cross section to provide a corner for the enclosure, as will appear.

These and other objects and advantages of the invention, as well as the details of an illustrative embodiment, will be more fully understood from the following specification and drawings, in which:

DRAWING DESCRIPTION

FIG. 1 is a top plan view of two interconnected panel units;

FIG. 2 is an enlarged fragmentary section taken on lines 2—2 of FIG. 6, to show details of panel unit construction;

FIG. 3 is a view like FIG. 2 showing a modification;

FIG. 4 is a view like FIG. 2, showing a corner construction;

FIG. 5 is a view like FIG. 2 showing a modified corner construction;

FIG. 6 is a perspective view of an enclosure constructed of panel units as referred to; and FIG. 7 is an elevation at the inside of the FIG. 6 enclosure, showing interior interconnection of panel units.

DETAILED DESCRIPTION

In FIGS. 1, 2 and 6 a radiation shielding structural component comprises a longitudinally elongated body 10 having L-shaped cross section or sections in lateral planes normal to the longitudinal direction. As is clear in FIG. 1, there may be two such L-shaped cross sections associated with each body 10, one at each lateral end portion thereof. Each body 10 includes a panel or sheet shaped core 11 of radiation shielding material such as lead, the radiation to be protected against being $\alpha$, $\beta$ or $\gamma$ radiation. Core 11 extends both laterally (see arrows 12) and longitudinally (see arrows 13), and has thickness "$t_1$".

The body 10 also includes glass fiber layers surrounding the core and attached thereto as by suitable synthetic resins (epoxide, for example), such resins also impregnating the glass fiber material. Thus, for example, layers 14 and 15 extend at the inner and outer sides of the core, with sub-layers 15a extending adjacent the outer side of core lateral end extents 11a, merging with layer 14 at the lateral ends 16. See FIG. 2. The glass fibers are applied to the core in such manner as to also provide glass fiber flanges 17 extending in planes generally normal to the plane of core 11, the like flanges located at laterally opposite ends of the core and merging with layers 14 and 16. Thus, a rigid laminate is formed, with the flanges rigidly attached.

FIGS. 2 and 7 show the use of the flanges of adjacent units, which abut one another at 19 and are laterally bored at 18 to receive removable fasteners such as bolts 20 having heads 20a and shanks 20b, and nuts on the threaded shanks. This brings the cores 11 of adjacent units in lateral end proximity, but separated by the glass fiber ends 16. For complete shielding, an auxiliary panel 24 is located in bridging relation to the core end extents 11a, and adjacent glass fiber sub-layers 15a, i.e. at the outer sides of the bodies 10. Panel 24 also contains a laterally and longitudinally extending core sheet 25 of radiation shielding material, such as lead, which bridges the core and extents 11a, so that radiation cannot pass through the assembly. Glass fiber and resin layers 26 and 27 are bonded to opposite sides of core 25, providing a composite of thickness $t_2$ which approximates the depth of a recess 29 that receives the auxiliary panel.

Recess 29 is formed by the interconnected bodies, so that the outer surface of the auxiliary panel is substantially flush with the surfaces of the glass fiber sub-layers 15b associated with bodies 10. Sub-layers 15b are spaced outwardly from the cores 11 to cover and attach to filler sheets 31 extending in parallel sandwiched relation to or with the cores 11. Filler sheets 31 typically consist of lightweight plastic material such as styrene, for example. Sub-layers 15b merge with sub-layers 15a, at the stepped locations 15c adjacent the ends of filler sheets 31. Auxiliary panel 24 may be pressed into position, with slight interference with the shoulders 15d, or they may be bonded to those shoulders or to sub-layers 15a.

Accordingly, complete shielding is provided, in a flush-surfaced assembly, which may be easily assembled to form an enclosure 35 in a larger room 36 (see FIG. 6), and easily removed, if required.

FIG. 3 is similar to FIG. 2, but shows an alternative method of retaining the auxiliary panel 24 in position. Panel 24 incorporates a web 38 that projects between the flanges 17, for removable fastener retention. Web 38 may consist of molded glass fibers and resin.

In FIG. 4, the units 10 are same as in FIG. 2, excepting that instead of extending in parallel end-to-end relation, they extend in planes which are relatively normal to one another, for forming a corner of the enclosure. An auxiliary panel 124 having L-shape overlaps both units 10, i.e. extends in the now separated sub-recesses 129, which also now have L-shape, thereby to form a corner, as shown in FIG. 6. Note that the surfaces 129a of the panel 124 are substantially flush with outer surfaces of layers 15b on units 10. The panel 124 may be lightly bonded to layers 15a; also panel 124 is shown to incorporate styrene or other plastic layers 40 between glass fiber and resin layers 126 and 127. Accordingly, full corner radiation shielding is provided.

In FIG. 5 the L-shaped corner panel 224 extends about and adjacent non-flanged ends of units 10, one unit end abutting the side of the other unit, as shown. Full corner radiation shielding is then provided. (See lead layers 211 and 225 extending in overlapping relation).

We claim:

1. A radiation shielding structural component, comprising in combination
   (a) two longitudinally elongated bodies each having L-shaped cross-section in lateral planes normal to the longitudinal direction,
   (b) each body including a panel shaped core consisting of radiation shielding material, and glass fiber layers surrounding said core and attached thereto in covering relation therewith,
   (c) each body including a filler sheet extending in sandwiched relation to the core and the glass fiber layers, and generally parallel to the core,
   (d) said bodies forming a recess located edgewise between said filler sheets and overlapping portions of the cores closest to said flanges, the recess adapted to receive an auxiliary panel that incorporates an auxiliary core consisting of radiation shielding material, and glass fiber layers at opposite sides of said auxiliary core,
   (e) and including said auxiliary panel in said recess and the auxiliary core of which overlaps said core portions of said bodies, the panel attached to said bodies.

2. The combination of claim 1 wherein said bodies have external flanges extending in planes generally normal to planes defined by said cores, the flanges located in proximity to one another to be externally interconnected.

3. The combination of claim 2 including fastener means releasably interconnecting said flanges which consist of glass fiber extensions of the glass fiber layers surrounding said body cores.

4. The combination of claim 2 wherein said flanges are integral with said cores but do not contain core material, the cores of the two bodies extending with proximity to one another.

5. The component of claim 2 wherein said flanges project at one side of said bodies and said auxiliary panel is located at the opposite side of said bodies.

6. The combination of claim 2 including a web integral with said auxiliary panel and projecting between said flanges for retention.

7. The combination of claim 1 wherein said recess has L-shape.

8. The combination of claim 7 wherein said auxiliary panel has L-shape, the cores of the two bodies defining planes which are orthogonal.

9. The combination of any one of claims 1–5 and 6–8 wherein the cores consist of lead.

* * * * *